United States Patent [19]
Hayes et al.

[11] Patent Number: 5,867,794
[45] Date of Patent: Feb. 2, 1999

[54] AUDIO-OUTPUT FOR A PORTABLE RADIO TELEPHONE UTILIZING A VEHICLE'S AM/FM RADIO

[75] Inventors: John J. Hayes, Wake Forest; David R. Irvin, Raleigh, both of N.C.; Ted G. Ericsson, Lomma; Jim A. J. Rasmusson, Brosarp, both of N.C.

[73] Assignee: Ericsson Inc., Research Triangle Park, N.C.

[21] Appl. No.: 717,102

[22] Filed: Sep. 20, 1996

[51] Int. Cl.⁶ ........................................................ H04Q 7/32
[52] U.S. Cl. ............................. 455/557; 455/569; 455/575
[58] Field of Search ................................... 455/556, 553, 455/569, 575, 90, 102, 103, 118, 345

[56] References Cited

U.S. PATENT DOCUMENTS 2,959,644  11/1960  Grace .
5,239,309   8/1993  Tang et al. ............................. 455/103
5,243,640   9/1993  Hadley et al. ......................... 455/557
5,319,716   6/1994  McGreevy ............................. 455/345
5,404,391   4/1995  Wavroch et al. .
5,418,836   5/1995  Yazaki .................................. 455/569
5,448,357   9/1995  Hirata .................................. 455/345
5,463,356  10/1995  Palmer .
5,584,052  12/1996  Gucau et al. ........................... 455/90
5,714,932   2/1998  Castellon et al. .................... 455/67.1

FOREIGN PATENT DOCUMENTS 2264613  9/1993  United Kingdom .

Primary Examiner—Edward F. Urban
Attorney, Agent, or Firm—Nixon & Vanderhye P.C.

[57] ABSTRACT

A wireless telephone communication device is operated in a hands-free mode with detected received audio being relayed for output on the speakers of a radio. A single two-frequency FM transmitter or a multi-frequency transmitter that transmits simultaneously on a plurality of channels relays the audio to the FM radio.

19 Claims, 5 Drawing Sheets

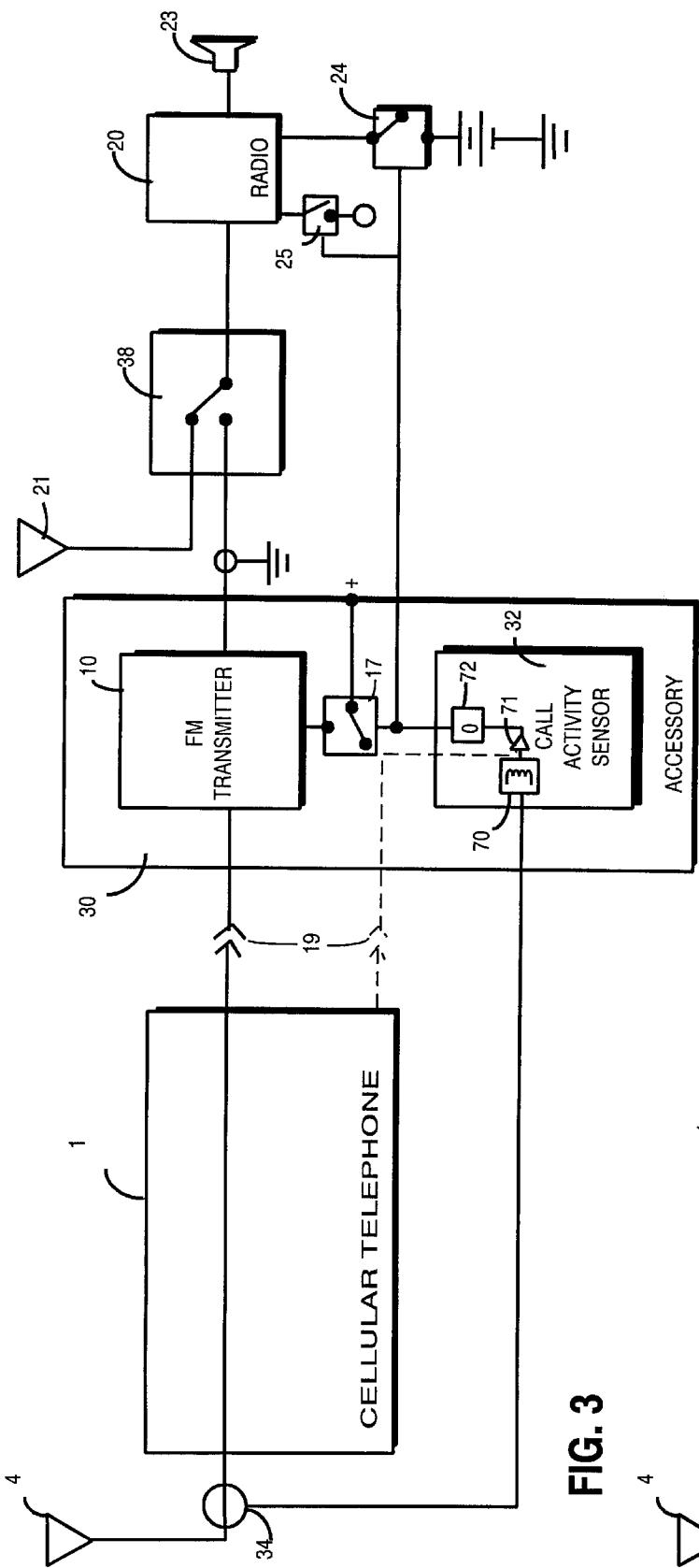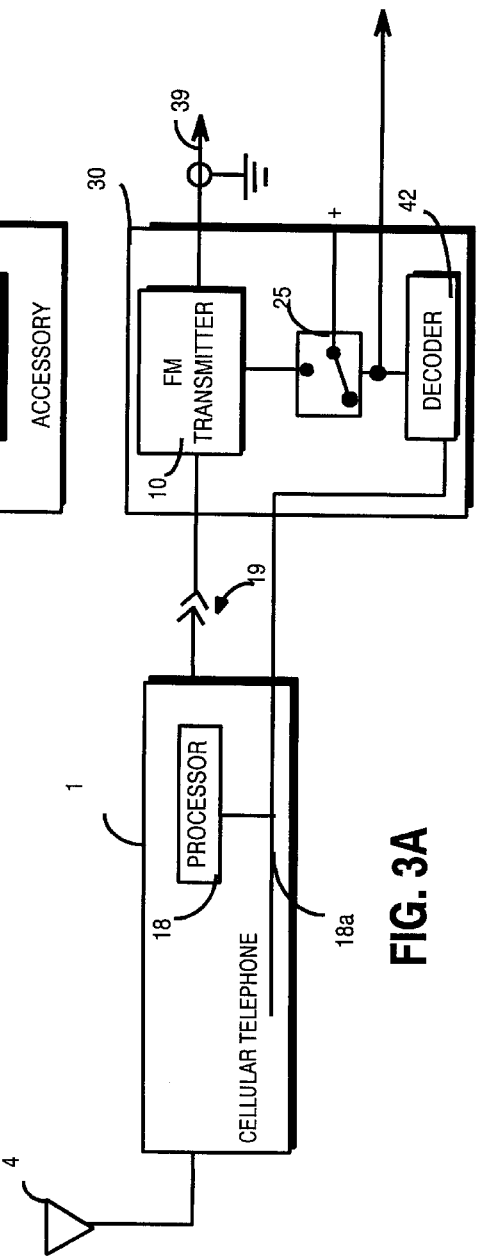
FIG. 3
FIG. 3A 5,867,794

AUDIO-OUTPUT FOR A PORTABLE RADIO TELEPHONE UTILIZING A VEHICLE'S AM/FM RADIO

FIELD OF THE INVENTION

The invention is in the field of hands-free portable cellular telephone equipment. More particularly, the invention relates to the use of an FM radio as part of a hands-free system.

BACKGROUND OF THE INVENTION

As the RF performance of a hand-held cellular telephone increases, the likelihood that it will be used by the driver of a moving vehicle also increases. This raises a safety concern. In response to this concern, the hands-free accessory to the cellular telephone has evolved. The basic purpose of the hands-free accessory is to affix the cellular telephone to the vehicle in an advantageous way, and thereby free the driver from distractions having to do with holding, manipulating and positioning the telephone.

Because the hands-free unit is an external accessory to the vehicle as well as to the telephone, the hands free-unit must live within certain design constraints. Among the most pressing of these constraints are physical bulk and aesthetics, both of which impose strict limits on the size of loudspeakers and the capacity of related audio components that can be included in the hands-free unit. As a result, hands-free units on the market today generally have poor audio-output characteristics, which compromise their effectiveness in the high-noise environment that is typical of a moving vehicle.

The prior art offers several devices to combat the limitations outlined above, but none is entirely satisfactory.

One device from the prior art is an automatic mute device for the vehicle's AM/FM radio. Such a device senses the presence of RF energy emanating from the transmitter of a cellular telephone that is powering-up to engage in a call and mutes the radio.

In U.S. Pat. No. 5,404,391, an automatic mute device comprising an antenna connected to a tuned circuit is used to sense voice channel activity on the cellular telephone. In response to sensing voice activity, the device provides a signal which disconnects power to the radio.

Another kind of automatic mute device, interposed in the audio path between the radio output and the vehicle's speakers, serves to interrupt the audio path and thereby mute the radio output in response to the electrical signal when that cellular telephone is actively engaged. This approach does nothing, of course, to improve the audio output quality of the cellular telephone, although it does remove an important source of interfering audio noise.

In a prior art refinement of the device just described, the automatic mute device includes its own power output audio amplifier. When the vehicle's radio is muted, the mute device also switches the vehicle's loudspeakers from the output of the radio to the output of the mute device's internal amplifier, and thereby makes the vehicle's speakers available to the audio signal produced by the cellular telephone.

This approach improves the audio output quality of the cellular telephone. Unfortunately, the installation of such a device is somewhat involved, as the vehicle's plurality of speakers must be routed through and controlled by the mute device. Also the volume of the mute device's audio output needs to be re-set as the level of external noise changes. Perhaps more importantly, the power output audio stages already present in the radio are unproductively duplicated in the mute device, thereby leading to unnecessary cost. Moreover, the DC electrical power required by the added power output audio stages is significant, which necessitates the presence and expense of a heavy-duty electrical service to the automatic mute device.

OBJECTS OF THE INVENTION

It is an object of the invention to provide a hands-free communicator, such as a portable cellular telephone, operation with improved audio-output quality.

It is a further object of the invention to provide a hands-free portable communication device operation with increased audio output power.

Another object of the invention is to provide a hands-free portable cellular telephone with increased audio output power and good audio-output quality that is easy to install.

Another object of the invention is to provide a hands-free portable communication device operation with voice audio output over the speakers of a radio.

Another object of the invention is to provide a hands-free portable cellular telephone component of reduced physical size and DC power requirements.

BRIEF DESCRIPTION OF THE INVENTION

A portable communication device such as a cellular telephone unit or an accessory is provided with an AM (amplitude modulated) or FM (frequency modulated) transmitter for transmitting in the commercial AM or FM radio frequency band. The AM or FM transmitter relays the audio information to the AM/FM radio receiver which outputs the audio in a conventional manner over the radio speakers. This provides for high quality audio output, particularly in the environment of an automobile.

In one embodiment of the invention, an AM or FM transmitter is constructed within or attached to the case of the portable cellular telephone unit. In other embodiments, the AM or FM transmitter is constructed in an accessory component which is adapted to hold or cradle the portable cellular telephone unit. A call activity detector is used to detect call activity and switch the vehicle AM/FM radio from commercial broadcast reception to reception from the AM or FM transmitter in the accessory.

The FM transmitter may be constructed as a simple two-frequency unit wherein it is tuned to broadcast on one of two adjacent FM channels. Alternatively, where constructed in an accessory, the FM transmitter may be constructed to broadcast simultaneously on a plurality of FM channels.

BRIEF DESCRIPTION OF THE DRAWINGS

FIG. 3 shows a second embodiment of the invention where an FM transmitter is constructed in an accessory along with a call activity detector for switching a vehicle radio to receive the output of the FM transmitter;

FIG. 3a illustrates a second version of the second embodiment; and

DESCRIPTION OF THE PREFERRED EMBODIMENTS

The invention is described with reference to an FM transmitter in a portable cellular telephone. The invention is, however, not limited to such as the transmitter in the various embodiments may be an AM transmitter for use with an AM radio and the cellular telephone may be any wireless telecommunications device, e.g., a portable telephone, a police or public service hand-held communicator.

In a first embodiment, a low-power (few tens of milliwatts), limited range transmitter is constructed within the case that houses a cellular telephone unit. When engaged in a call, the transmitter relays incoming audio signals from the cellular telephone unit to the vehicle's radio via a wireless link. The radio receiver circuits detect and amplify the relayed signal and output the resulting audio to the vehicle's speakers, thereby providing high quality audio.

Figure 1:
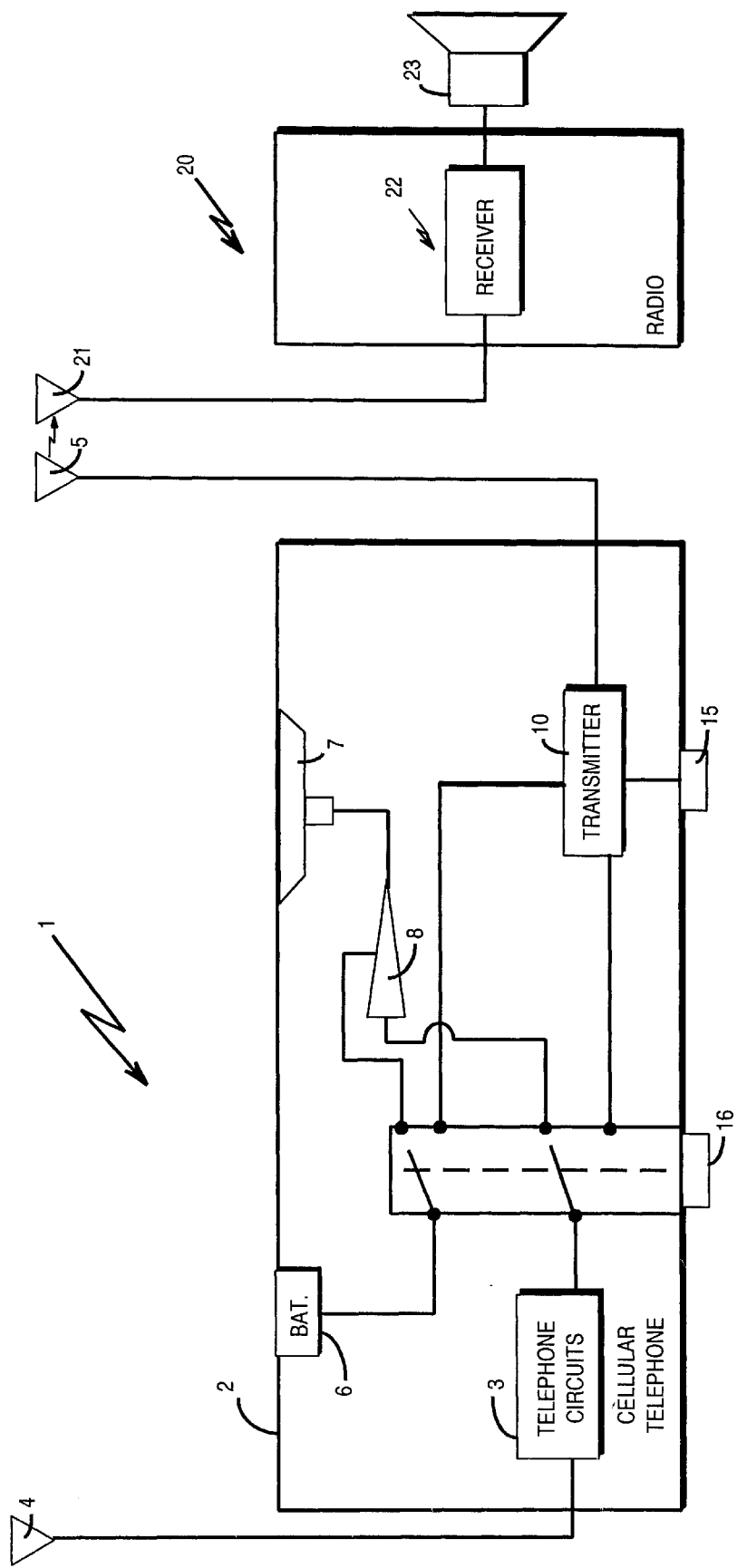
FIG. 1 shows a first embodiment of the present invention, wherein a limited-range transmitter is integrated with the cellular telephone.

FIG. 1 illustrates this embodiment in its simplest form. Within the casing 2 of portable cellular telephone unit 1 there is constructed conventional telephone receiving/transmitting and processing circuits 3 (which may include a microprocessor), speaker 7, audio amplifier 8, battery 6, and in accordance with the invention a transmitter 10, switch 16 and frequency control element 15. Portable unit 1 in addition to conventional antenna 4 has an antenna 5 for transmitting an RF signal in the commercial radio band for reception by a radio.

The transmitter 10 constructed as an FM transmitter has the capability to operate on two frequencies that fall on adjacent channels within the commercial FM radio broadcast band (88–108 MHz). Since commercial broadcast is not allowed on adjacent channels, at least one of the two frequencies will be clear. The low-power, FM transmitter output frequency is set to a clear channel. This setting is during initial installation of the system in the vehicle by manipulation of frequency control element 15 which may be a tuning control or a switch.

A switch 16 provided on the portable telephone casing 2 is associated with the activation of the FM transmitter 10. Upon is switching to the hands-free mode, switch 16 as illustrated connects DC power from battery 6 to FM transmitter 10, disconnects power to audio amplifier 8 and switches the input audio signal to output amplifier 8 to an FM modulator in the FM transmitter 10. In the hands-free mode, it is advantageous to disconnect or remove audio from the telephone speaker 7 to discourage or prevent its use in the conventional mode, i.e., with the speaker adjacent the user's ear, since the FM transmitter is transmitting RF energy. This also allows for the use in the hands-free mode of a cellular transmitter with greater output power. Moreover, by not driving the telephone speaker 7 during the hands-free use, the battery power of the telephone battery 6 is conserved.

Further illustrated in FIG. 1 is a conventional FM radio 20 with its antenna 21 coupled to FM receiver 22. The FM receiver 22 is connected to one or more speakers 23.

A user of the unit desiring a hands-free operation, manipulates switch 16 on casing 2 of the cellular telephone unit 1 to the hands-free position and tunes or sets FM radio 20 to the frequency of the low-power FM transmitter 10. The cellular telephone unit 1 is clipped onto the sun visor of the vehicle or secured in any convenient manner that facilitates a hands-free use.

Figure 1A:
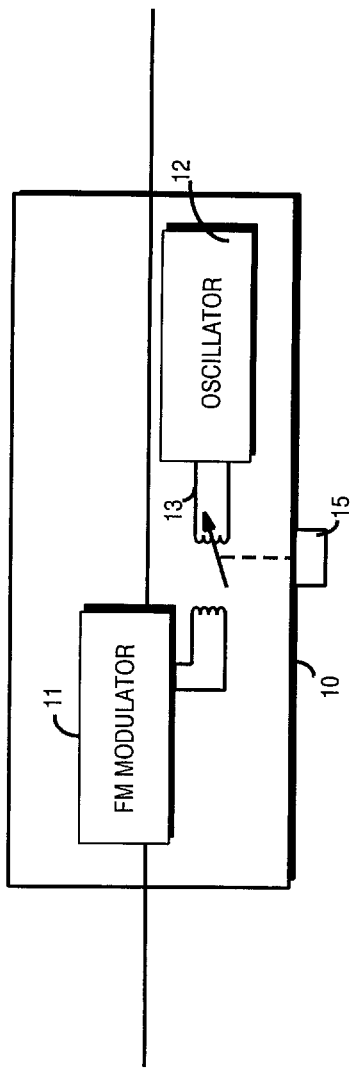
FIG. 1a illustrates a first form of a simple two-frequency FM transmitter.

FIG. 1a illustrates a simple and an economical FM transmitter 10 that may be constructed in the casing 2. It comprises a conventional FM modulator 11, and an oscillator 12 that is tunable over a range (~200 kHz) that encompasses at least two FM broadcast channels. A tunable output tank circuit 13 in the oscillator is tuned by frequency control element 15 through tuning of a coil. In the initial installation as describe above, the frequency control element 15 is used to tune the oscillator 12 carrier frequency to an FM frequency corresponding to that of a clear FM radio channel.

Figure 1B:
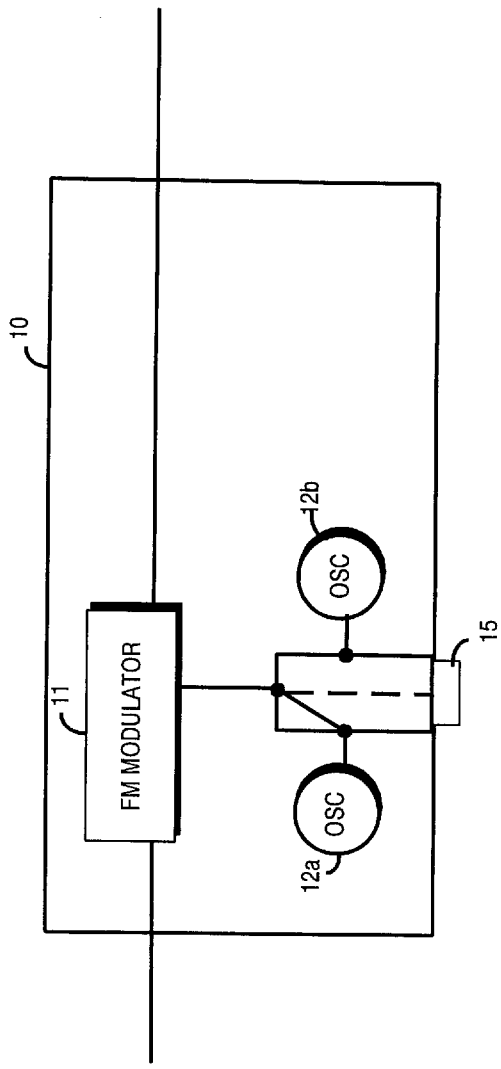
FIG. 1b illustrates a second form of a simple two-frequency FM transmitter.

FIG. 1b illustrates another version of an FM transmitter that may be incorporated in the casing 2. Here there are two FM carrier oscillators 12a and 12b, and element 15 is merely a switch for connecting one of the oscillators to the FM modulator 11 for causing the FM transmitter 10 to transmit at one of two adjacent FM channel commercial broadcast frequencies. This provides for an easier initial setting as the switch merely is moved between two positions while listening to the FM radio tuned to the clear channel. While one switching arrangement is shown, other arrangements for connecting one oscillator or the other to the FM modulator would be apparent to one skilled in this art.

FIGS. 1a and 1b are only illustrative of the manner in which the FM transmitter 10 can be constructed to transmit at either one of two FM broadcast channel frequencies. A phase locked loop with a processor which changes the division factor would be another arrangement. Modifications of the circuit of FIG. 3, described herein, to transmit the two frequencies would be another means for providing the two requisite FM frequencies.

Figure 2:
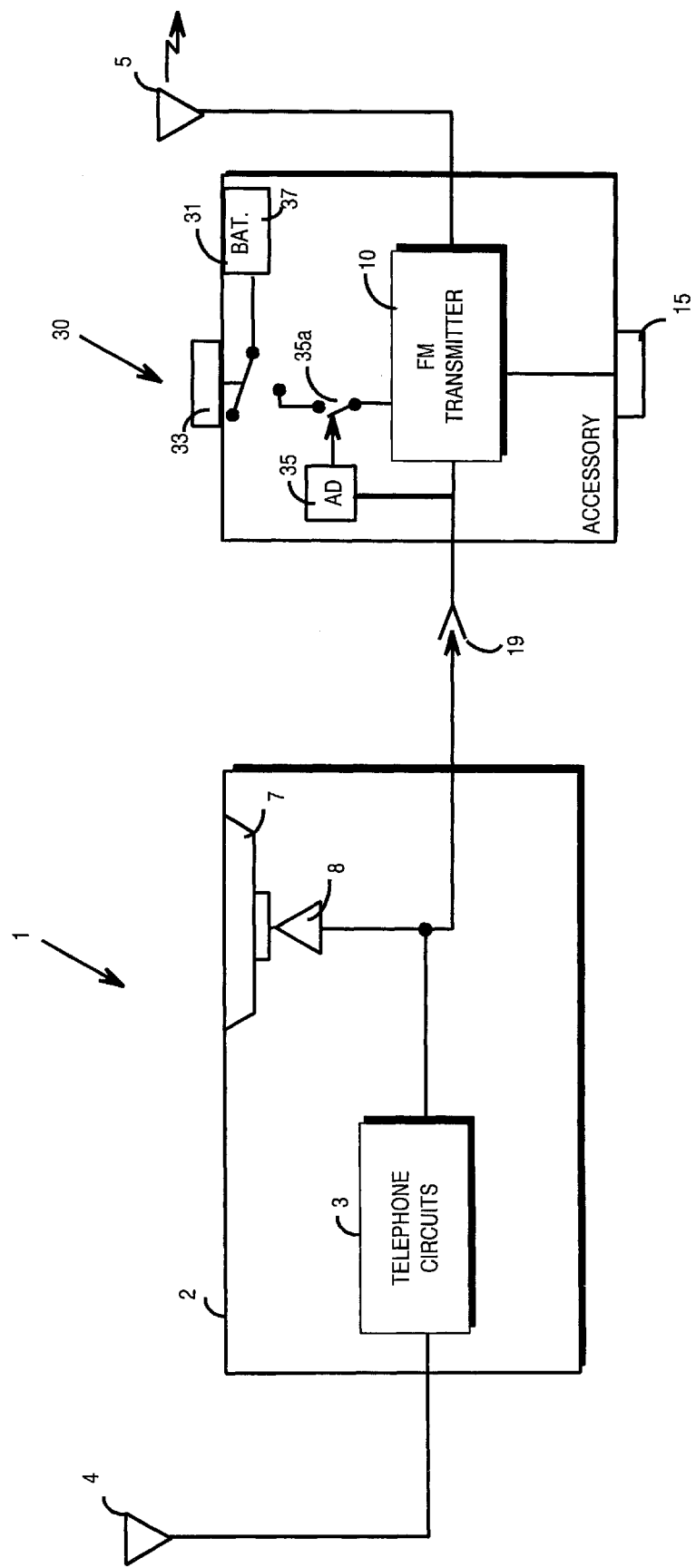
FIG. 2 shows an alternative of the first embodiment where an FM transmitter is in an accessory.

In an alternative version of the FIG. 1 embodiment, the FM transmitter 10 is incorporated within a case 31 that houses a hands-free accessory unit 30 as shown in FIG. 2. The hands-free accessory unit in this version is a device which holds or cradles the portable cellular telephone unit. A power ON/OFF switch 33 is manipulated to the ON position for hands-free use. The power line to the FM transmitter 10 may alternatively or additionally be interlocked at 35a via an audio signal detection circuit 35 such that the FM transmitter is off in the absence of detected audio signals. Power for operating the FM transmitter is provided from a battery 37 in the accessory or alternatively from the vehicle's electrical system. Detected audio signals are connected from the cellular telephone unit 1 to the accessory 30 via connection pins 19 of an electrical connector joining the telephone to the accessory when set in the accessory. In this alternative, the FM clear channel is selected manually by control 15 at the time the hands free-unit is installed. FM broadcast band signals are transmitted via antenna 5 to the FM radio 20 in the vehicle.

In either alternative of the first embodiment, ease of installation is a paramount feature since no modification of the vehicle radio is required. There is no electrical connection between the vehicle radio and the cellular telephone or the accessory.

In a second embodiment of the present invention, as shown in FIG. 3, FM transmitter 10 is housed in accessory 30 and the output of the FM transmitter is connected by a shielded cable 39 to the RF input of the vehicle radio. Because of the direct connection between the FM transmitter 10 and the radio 20 and further because of the shielding of this connection, the possibility of RF transmission outside the vehicle is greatly reduced.

As shown in FIG. 3, wherein like components are numbered the same as in FIG. 1, FM transmitter 10 is located in hands-free accessory 30. The hands-free accessory 30 receives audio signals from the portable telephone unit via a direct connection when the portable cellular telephone unit 1 is held by or is otherwise mounted in physical contact therewith. Standard connection pins 19, provide electrical connections between the cellular telephone unit 1 and accessory 30. Hands-free accessory 30 is connected by shielded cable 39 to the FM radio 20.

Also constructed within the hands-free accessory 30 is a call activity detector 32, which upon the detection of telephone activity actuates a switch 38 to switch the RF input from the antenna 21 to the FM transmitter 10 output. Actuation of switch 38 establishes a direct electrical connection between the cellular telephone and the RF input of the radio. Call activity detector 32 may be an automatic mute device, similar as in prior art mute devices, in that it, by an RF pick-up device physically located within the casing of the accessory and illustrated schematically at 34, senses the cellular telephone activity by picking up signals on a voice channel frequency in the cellular telephone band (824 to 844 MHz). As such, the call activity detector 32 is basically a voice activity detector comprised of a tuned circuit 70 tuned to pickup RF signals in the cellular telephone band, an amplifier 71 in which the signals are amplified and a detector 72 that detects either the RF signal or a modulating signals on the RF and provides an actuating signal. The actuating signal of device 32, however, unlike prior art mute devices, is not used to silence the radio speakers or cut off power to the radio, but connects the radio to the FM transmitter 10 RF output by actuation of switch 38. Thereby, the radio speakers support the radio in its new role as an extended audio system of the cellular telephone. The voice activity detector may sense RF radiation in the cellular telephone band by means of an electromagnetic radiation pickup device, e.g., an antenna, or alternatively it may be directly connected (as shown in dotted lines) to the circuitry in the cellular telephone unit via connection pins to detect call activity, e.g., a call in progress, origination of an outgoing call, or paging to accept an incoming call.

As in the first embodiment, the user of the system tunes or sets the radio 20 to a predetermined frequency on which the FM transmitter 10 is operating when the phone is engaged. The predetermined frequency is selected, the same as above, when the hands-free accessory is installed.

In this embodiment, because of the shielded cable 39 connection, the possibility of RF transmissions from the FM transmitter 10 outside the vehicle is reduced, the FM transmitter 10 is not located in the hand-held portable cellular telephone unit 1, and power for the FM transmitter 10 does not come from the battery of the cellular telephone unit but from a battery in the accessory or from the vehicle's electrical system.

A variation of the second embodiment is shown in FIG. 3a. A decoder 42 is used as the call activity detector. Electronic equipment in the cellular telephone unit 1 operating under microprocessor 18 control includes a system bus 18a on which commands and data are exchanged among the processor and the devices that it controls. Commands are provided to indicate a plurality of states, including "call in progress", "outgoing call origination" and "incoming call page." These states are represented by unique bit patterns on the system bus 18a. The decoder 42 of FIG. 3a, which may comprise discrete digital logic circuits or a second microprocessor, monitors the cellular telephone system bus 18a, decodes commands that appear on that bus, compares the decoded values to predetermined values that denote the three states, "call in progress", "outgoing call origination" and "incoming call page" and generates an electrical signal whenever one of the three states is detected. Thus, the decoder 42 decodes commands on the system bus 18a of the cellular telephone, determines therefrom the presence of telephone activity and generates an electrical signal that actuates switch 38 to connect the output of FM transmitter 10 to the RF input of the radio 20.

In the second embodiment, the switch 38 is shown to be located at the radio, but it may also be located at the accessory 30, with the shielded cable 39 connected between the output terminal of switch 38 and the RF input of radio 20.

The switch actuating signal from device 32 or 42 may be applied to a further switch 17 to connect power to the FM transmitter 10. The power may be provided to the accessory 30 by connection to the vehicle's electrical system, or a battery may be provided within the housing of the accessory.

Further, the switch actuating signal from device 32 or 42 may also be used to actuate a switch 24 to turn on the radio 20. This way, in the event the radio is off, the vehicle operator is not required to assess the fact that the system is not operating in the hands-free mode and determine that it is because the radio is off. Switch 24 is in shunt with the ON/OFF radio switch and is switched to the ON state by the device 30 detecting call activity. A switch 25 may also be actuated by the electrical signal to switch the radio 20 to the FM mode, if in an AM, cassette playing, or CD disc playing mode. These connections are easily made on a radio with remote control facilities.

Figure 4:
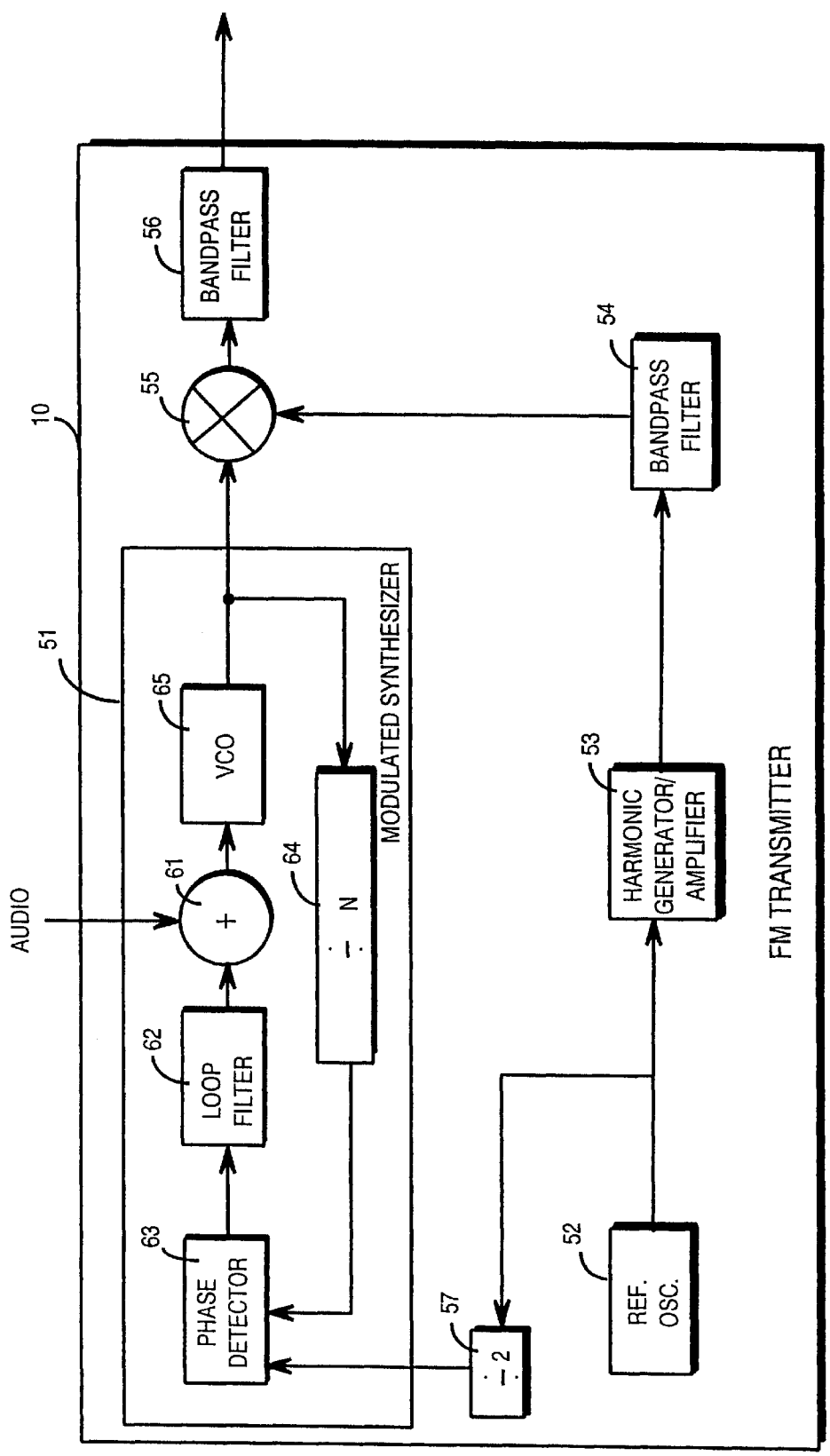
FIG. 4 shows an FM transmitter for transmitting simultaneously on plural FM channels.

FIG. 4 illustrates an FM transmitter that may advantageously be used in the second embodiment in lieu of the hereinbefore described two-frequency FM transmitter. This is a more complex transmitter that transmits simultaneously on a plurality of channels within the FM broadcast band. With this transmitter, it is no longer necessary for an occupant of the vehicle to tune or set the frequency of the radio in response to a telephone call, because the call will be rebroadcast to the radio over all the FM channels. This is an improvement having the important safety advantage of further minimizing the diversion of a driver's attention.

In FIG. 4, block 51 comprises a frequency synthesizer of PLL (phase lock loop) design which includes VCO (voltage controlled oscillator) 65, a divide-by-N unit 64, phase detector 63, and filter 62. A summing circuit 61 is inserted between filter 62 and VCO 65 to facilitate the introduction of audio signals from the cellular telephone unit. A frequency reference is provided to the phase detector 63 by a divide-by-two circuit 57 which provides a 100 kHz signal to the phase detector by dividing the output of 200 kHz reference oscillator 52.

In an exemplary operation, the VCO 65 oscillates at 98.1 MHz, and N in the divide-by-N unit 64 is set to 981 to provide a 100 kHz signal to one input of phase detector 63 for comparison with the 100 kHz reference signal from unit 57 at the other input. The phase difference between the two 100 kHz signals is provided to VCO 65 via summing circuit 61 to lock the VCO to the phase of oscillator 52. Audio from the cellular telephone unit introduced at summing circuit 61 modulates the VCO output frequency.

Turning to the overall circuit of FIG. 4, in addition to the modulated synthesizer 51, divide-by-two circuit 57 and reference oscillator 52, the FM transmitter comprises harmonic generator/ amplifier 53 connected to the output of reference oscillator 52, bandpass filter 54 connected to receive the output from harmonic generator/amplifier 53 and a mixer 55 for mixing the outputs from bandpass filter 54 and the VCO modulated synthesizer 51. A second bandpass filter 56 filters the output from the mixer 55.

Continuing with the exemplary operation, modulated synthesizer 51 operates at 98.1 MHz and reference oscillator 52 operates at 200 kHz. The output of reference oscillator 52 is input to harmonic generator/amplifier 53 which produces output signals at integer multiples of 200 kHz. These harmonics are filtered by bandpass filter 54, which attenuates harmonics falling outside the useful range of frequencies, above the 49th harmonic. Mixer 55 combines the modulated 98.1 MHz signal from synthesizer 51 with the various harmonics, and outputs simultaneous modulated signals having frequencies that fall on the various commercial FM broadcast channels above and below 98.1 MHz. For example, combining the third harmonic (600 kHz) with the modulated signal at 98.1 MHz results in modulated output signals at 98.7 and 97.5 MHz. Likewise, the fourth harmonic combined with the modulated signal at 98.1 MHz produces outputs at 98.9 and 97.3 MHz. The output of mixer 55 is filtered by a bandpass filter 56 having a passband of 88–108 MHz. The output of the filter is connected to switch 38.

Although one particular structure for the multi-frequency transmitter is set forth in FIG. 4, other variations of the multi-frequency transmitter structure will be apparent to those of ordinary skill in the art of RF design. Therefore, the structure show in FIG. 4 is by way of example only rather than by way of limitation.

The operation frequencies described are those nominally employed in the U.S. The invention is not limited to the described frequencies. A microphone may be associated in a conventional manner with the accessory to further facilitate the hands-free operation. Switches, such as 17, 24, 25 and 38 may take the form of a transistor, an integrated circuit, or other solid state devices as will be appreciated by those skilled in the art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An accessory connectable to a portable radiotelephone, comprising:
    an input connection terminal for connecting to the portable radiotelephone;
    a radio transmitter, adapted to receive audio signals produced in a receiving section of the portable radiotelephone, for modulating a radio frequency (RF) signal using the received audio signals and transmitting the modulated RF signal at low power in a commercial radio broadcast band for radios; and
    a call activity detector detecting call activity at the portable radiotelephone.

2. An accessory for a portable radiotelephone as in claim 1, further comprising:
    an antenna coupled to the radio transmitter for wireless transmission of said RF signals to a radio.

3. An accessory for a portable radiotelephone as in claim 1, wherein the call activity detector actuates a first switch to connect the RF output of the transmitter to an RF input of a radio within the vicinity of the accessory.

4. An accessory for a portable radiotelephone as in claim 3, further comprising:
    a shielded cable connecting the RF output of the transmitter to an input terminal of said first switch.

5. An accessory as in claim 3, further comprising:
    a shielded cable connecting an output of said first switch to the RF input of said radio.

6. An accessory as in claim 3, wherein said call activity detector comprises a decoder for detecting and decoding commands on a system bus of a portable cellular telephone.

7. An accessory for a radiotelephone as in claim 3, wherein said call activity detector further actuates a second switch to turn on the radio, and a third switch to cause the radio to be in the FM mode.

8. An accessory for a radiotelephone as in claim 7, wherein said call activity detector further actuates a fourth switch to provide power to the FM transmitter.

9. An accessory for a portable radiotelephone as in claim 1, further comprising:
    control means for selectively operating said transmitter at one of two frequencies of adjacent channels in the commercial FM broadcast band.

10. An accessory for a portable radiotelephone, comprising:
    an input connection terminal for connecting to the portable radiotelephone;
    a radio transmitter, adapted to receive audio signals produced in a receiving section of the portable radiotelephone, modulating a radio frequency (RF) signal using the received audio signals and transmitting the modulated RF signal in a commercial broadcast band for radios, and
    a call activity detector detecting call activity at the portable radiotelephone,
    wherein said radio transmitter transmits simultaneously on a plurality of channels in the FM broadcast band.

11. An accessory for a portable radiotelephone as in claim 10, wherein said radio transmitter comprises:
    a phase lock loop modulated synthesizer for receiving said audio signals and outputting an audio modulated FM signal,
    a harmonic generator for providing harmonics of a reference signal, and
    a mixer for mixing the audio modulated FM signal and the harmonics to produce simultaneously a plurality of FM signals.

12. A communications system for use in an automobile, comprising:
    a mobile radio telephone unit including:
        a radio transceiver transceiving in a mobile radio frequency band, and
        a radio transmitter wirelessly transmitting at low power in a commercial radio broadcast band signals received from the radio transceiver, and
    a radio including:
        a first speaker, and
        a receiver for receiving wireless transmissions in the commercial radio broadcast band, processing the received transmissions, and providing the processed transmissions to the first speaker,
    wherein when a call is received by the mobile radio telephone unit, the radio transceiver provides an audio signal corresponding the call to the radio transmitter, the radio transmitter wirelessly transmits the audio signal in the commercial radio broadcast band, and the receiver receives the transmitted signal and provides the audio signal to the first speaker.

13. A communication system as in claim 12, wherein the transmitter is an FM transmitter including a selector for setting said FM transmitter to transmit the RF signals at the frequency of one of two adjacent channels in the FM commercial broadcast band.

14. A communication system as in claim 12, wherein the communications unit may be operated in a hand-held mode of use and a hands-free mode of use with mobile radio further including:
   a second speaker,
   a switch connecting a power source to drive the second speaker or to drive the transmitter; and
   a switch actuator,
   wherein the switch actuator is operated so that in the hands-free mode,
   the switch removes power to the second speaker and provides power to the transmitter, and in the hand-held mode, the switch provides power to the second speaker.

15. A communication system as in claim 12, further comprising:
   a first antenna coupled to the radio transceiver,
   a second antenna coupled to the transmitter, and
   a third antenna coupled to the receiver.

16. A communication system as in claim 15, wherein the transmitter is located within a casing of the mobile radio telephone unit and the first and second antennas are carried by the casing.

17. A method of radio communications of a voice signal modulated onto a radio frequency (RF) signal in a portable radiotelephone frequency band, comprising the steps of:
   receiving the voice-modulated, RF signal in a portable radiotelephone;
   converting the received, voice-modulated RF signal into a voice-modulated RF signal in a commercial radio broadcast frequency band different from the portable radiotelephone frequency band;
   wirelessly transmitting the voice-modulated RF signal in the commercial radio broadcast frequency band at low power;
   receiving in a radio receiver the wirelessly-transmitted, voice-modulated RF signal in the commercial radio broadcast frequency band; and
   extracting the voice signal from the wirelessly transmitted voice-modulated RF signal in the commercial radio broadcast frequency band and providing the extracted voice signal to a speaker coupled to the radio receiver.

18. A method as in claim 17, wherein said wirelessly transmitting step is over a clear channel in the frequency band of an FM radio.

19. A method as in claim 17, wherein said transmitting is at simultaneous multiple frequencies in the commercial frequency band of an FM radio.

* * * * *